Figures 1, 2, 3:
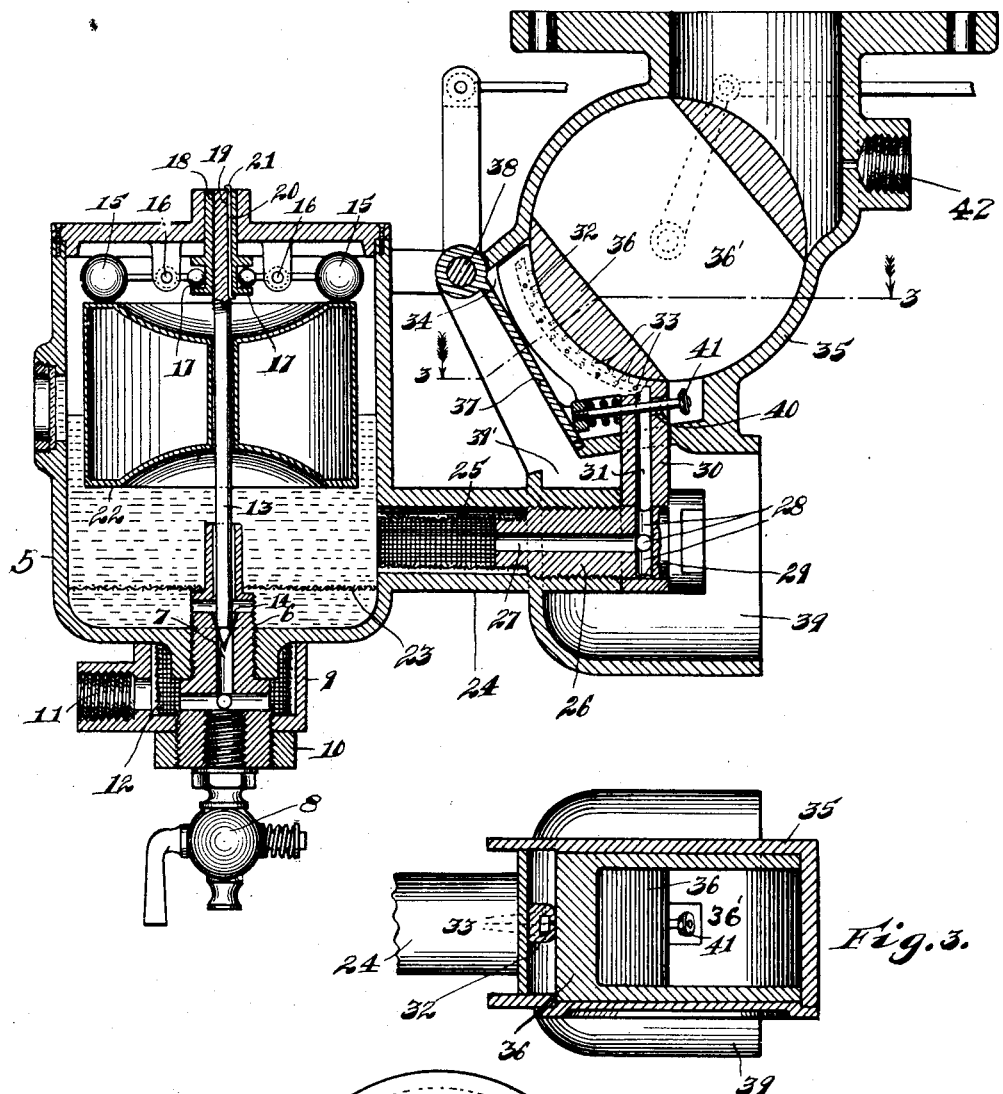

J. T. PETERSON.
CARBURETOR.
APPLICATION FILED JULY 3, 1917.

1,412,487.

Patented Apr. 11, 1922.

Witnesses:
C. E. Wessels
A. A. Olin

Inventor:
John T. Peterson,
By Joshua R. H. Potts
his Attorney.

UNITED STATES PATENT OFFICE.

JOHN T. PETERSON, OF MELROSE PARK, ILLINOIS.

CARBURETOR.

1,412,487.  Specification of Letters Patent.  Patented Apr. 11, 1922.

Application filed July 3, 1917. Serial No. 178,417.

*To all whom it may concern:*

Be it known that I, JOHN T. PETERSON, a citizen of the United States, and a resident of the city of Melrose Park, county of Cook, and State of Illinois, have invented certain new and useful Improvements in Carburetors, of which the following is a specification.

My invention relates to improvements in carburetors, and has for its object the production of a device of this character which will be adapted for use under all climatic conditions and temperatures and which, because of the control afforded in the air and fuel supply, will conduce to economy in fuel usage and at the same time in the production of a proper mixture at all times.

A further object is the production of a carburetor which will be of durable and economical construction and permit of ready adjustment and replacement of parts in case of disabling.

The invention consists in the combinations and arrangements of parts hereinafter described and claimed.

The invention will be best understood by reference to the accompanying drawings forming a part of this specification, and in which, Fig. 1 is a central vertical section through a carburetor, embodying my invention, Fig. 2, a top plan view of the float chamber of the device, and Fig. 3, a section taken on line 3—3 of Fig. 1.

The preferred form of construction, as illustrated in the drawings, comprises a float chamber 5 in the lower end of which is threaded a plug 6, having an entrance passage 7 formed therein. Said passage 7 has radial branches at its upper and lower ends, a drain cock 8 of conventional design being provided at the lower end of said plug. Surrounding the lower end of plug 6 and threaded thereon is a cup-shaped coupling 9, locked in position by means of a nut 10 threaded upon said plug. The member 9 forms an annular chamber which communicates with the outer ends of the radial branches at the lower end of passage 7, a threaded nipple 11 being provided at one side of the member 9 for connection with the source of fuel supply. The fuel entering the member 9 is required to pass through a wire mesh strainer 12, arranged therein, before entering the passage 7, as seen.

The flow of fuel from the passage 7 into the float chamber 5 is controlled by a vertically movable needle valve 13 which is adapted, when at its lower terminal of movement, or, in closed position, to engage a seat 14 formed at the upper end of passage 7.

Movement of the valve 13 is controlled by a pair of weights 15 which are pivoted intermediate their ends, as at 16, to the underside of the float chamber cover. The inner ends of weight members 15 engage loosely in an annular groove or channel 17, formed at the lower end of a sleeve 18 which is slidably mounted centrally in the float chamber cover, and which is in threaded connection with the upper end of valve 13.

With this arrangement it will be seen that vertical adjustment of the valve, relative to the weights 15 may be effected by rotating said valve in the sleeve 18. In order to lock the sleeve and valve in positions of rotary adjustment, said parts are formed with registrable longitudinally extending slots or grooves 19 and 20, respectively, said grooves, when in registration, being adapted for engagement by a key 21 in the form of a wire which may be inserted thereinto, said key or wire being locked in position by angularly bending or offsetting the respective ends thereof, as seen.

The arrangement is such, as will be seen, that the weights 15 serve, normally, to hold the valve in elevated or open position. Arranged in the float chamber for free vertical movement upon the valve 13 is a float 22 which is adapted, upon reaching a predetermined vertical position, to engage with the outer ends of weight members 15, causing the same to be elevated, and hence said weight members to be tilted in a manner to cause lowering of the valve to closed position. The vertical movement of the float in the chamber will thus serve to automatically control the inlet of fuel to the float chamber. Adjacent the lower end of the chamber is provided another wire mesh strainer 23 for removing any particles of foreign matter which may have escaped the strainer 12.

Leading from one side of the float chamber, adjacent the lower end thereof, is a fuel outlet pipe 24 in which is arranged another wire mesh strainer 25. Said strainer 25 encloses the inner end of a plug 26 threaded into the member 24, said plug having a central passage 27 from the outer end of which lead radial branch passages 28 which terminate in a circumferential groove 29. Mounted upon the outer end of the member 26 is a vertically extending member 30 in which a passage 31 is formed, which leads from the circumferential groove 29 of said member 26. The upper end portion 32 of the member 30 is of arcuate form and provided with a plurality of comparatively minute spaced discharge passages or openings 33. The portion 32 is comparatively narrow and traverses the passage 34 which leads to the housing or casing 35 of the throttle valve 36. Said throttle valve is rotatably mounted, the same being formed with two diametrically opposed peripheral sections or walls between which a space 36′ is formed which constitutes the mixing chamber of the device. The portion 32 of the member 30 is curved to conform with the peripheral curvature of said throttle valve, the arrangement being such that, upon rotation of said throttle valve from closed position, the passage 34 will be gradually or progressively opened and a progressively increasing number of fuel discharge passages 33 will also be uncovered.

The outer end of passage 34 is controlled by a flap valve or main air valve 37, rockingly mounted at 38. The outer end of the passage 34 opens into the outside atmosphere or into the cold air supply, a hot air supply passage 39 surrounding the outer end of the member 24 and opening upwardly into the passage 34 at 39′. The arrangement is such, as will be seen, that, when the valve 37 is rocked from closed position, as seen in Fig. 1, the hot air port 39′ will be first opened admitting hot air to said mixing chamber, and by a further opening movement of said valve the outer end of the passage 34 will be uncovered, permitting the admission of cold air to said mixing chamber. This arrangement is such that the temperature of the air admitted to said mixing chamber can be varied when desired. The air thus admitted to the passage 34 rushes past the peripheral fuel discharge member 32, at either side of the latter, the fuel and air passing into the mixing chamber 36′, where the same are thoroughly mingled, to form a combustible mixture.

Leading from the upper end portion of the fuel passage 31 is a by-pass 40 which, when open, communicates with the mixing chamber 36′ when the throttle valve is in closed position, or in the first stages of opening of the same. The by-pass 40 is controlled by a normally closed spring held valve 41. The arrangement is such that when the valve 37 is moved to closed position, the valve 41 will be engaged thereby and moved to open position. With this arrangement it will be seen that in starting the motor, as the throttle valve is opened, a very rich mixture will be first admitted through the by-pass, the mixture thus admitted being free from any mixture with air, inasmuch as the valve 37 is closed. The rich mixture thus supplied to the motor will of course facilitate starting of the motor. After the motor has been started the valve 37 may be adjusted as desired to admit hot or cold air, it being desirable to admit first the hot air, especially in winter time or cold weather, until the motor is warmed up and running smoothly. Provided in the housing 35 above the throttle valve 36 is a threaded opening 42 to which an auxiliary air supply pipe may be connected if desired.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In a carburetor, the combination of a mixing chamber having an air intake passage; a fuel intake passage communicating with said air intake passage; a by-pass communicating with said fuel intake and said mixing chamber; a throttle valve governing the admission of fuel and air from said air intake passage into said mixing chamber; a main valve adapted upon its opening movement to admit hot air into said air intake passage and on a further opening movement, admit cold air into said air intake passage; and means actuated by the opening of said main valve adapted to stop the admission of fuel through said by-pass into said mixing chamber, substantially as described.

2. In a carburetor, the combination of a mixing chamber having an air intake passage; a fuel intake passage communicating with said air intake passage; a by-pass communicating with said fuel intake and said mixing chamber; a throttle valve governing the admission of fuel and air from said air intake passage into said mixing chamber; a main valve adapted upon its opening movement to admit hot air into said air intake passage and on a further opening movement, admit cold air into said air intake passage; and a spring held valve actuated by the opening of the said main valve adapted to stop the admission of fuel through said by-pass into said mixing chamber, substantially as described.

3. In a carburetor, the combination of a mixing chamber having an air intake passage; an arcuated member positioned in said intake passage, said arcuated member having a fuel intake passage communicating with said air intake passage; a by-pass com- communicating with said arcuated fuel intake passage and said mixing chamber; means for governing the admission of fuel and air through said air intake passage into said mixing chamber, said means adapted by an opening movement to admit hot air into said mixing chamber and by a further opening movement to admit cold air into said mixing chamber; and a spring held means actuated by the opening of said first mentioned means for stopping the admission of fuel direct to said mixing chamber, substantially as described.

In testimony whereof I have signed my name to this specification in the presence of subscribing witness.

JOHN T. PETERSON.

Witness:
HELEN F. LILLIS.